(12) United States Patent
Hashimoto et al.

(10) Patent No.: US 9,015,658 B2
(45) Date of Patent: Apr. 21, 2015

(54) AUTOMATIC PROGRAM GENERATION DEVICE AND AUTOMATIC PROGRAM GENERATION METHOD

(75) Inventors: Yasunori Hashimoto, Fujisawa (JP); Ryota Mibe, Sagamihara (JP); Shuhei Nojiri, Kawasaki (JP); Sadahiro Ishikawa, Yokohama (JP); Kiyoshi Yamaguchi, Kawasaki (JP); Kentaro Yoshimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 13/607,087

(22) Filed: Sep. 7, 2012

(65) Prior Publication Data
US 2013/0125091 A1 May 16, 2013

(30) Foreign Application Priority Data

Nov. 11, 2011 (JP) ................................. 2011-248099

(51) Int. Cl.
*G06F 9/44* (2006.01)
(52) U.S. Cl.
CPC ..... *G06F 8/30* (2013.01); *G06F 8/36* (2013.01)
(58) Field of Classification Search
None
See application file for complete search history.

(56) References Cited

U.S. PATENT DOCUMENTS

| | | | | |
|---|---|---|---|---|
| 6,877,155 B1* | 4/2005 | Lindsey | ........................ | 717/108 |
| 6,996,801 B2* | 2/2006 | Yoneyama | .................... | 717/107 |
| 7,343,606 B2* | 3/2008 | Schechter et al. | ............ | 719/318 |
| 7,689,917 B2* | 3/2010 | Washington et al. | ......... | 715/717 |
| 8,060,857 B2* | 11/2011 | Biggerstaff | ................... | 717/106 |
| 8,291,375 B2* | 10/2012 | Ireland | ........................ | 717/107 |
| 8,438,304 B2* | 5/2013 | Stelting | ........................ | 709/238 |
| 8,479,109 B2* | 7/2013 | Washington et al. | ......... | 715/763 |
| 2002/0129333 A1* | 9/2002 | Chandhoke et al. | .......... | 717/107 |
| 2004/0255300 A1* | 12/2004 | Schechter et al. | ............ | 719/313 |
| 2005/0216885 A1* | 9/2005 | Ireland | ........................ | 717/108 |
| 2006/0143570 A1* | 6/2006 | Washington et al. | ......... | 715/763 |

(Continued)

FOREIGN PATENT DOCUMENTS

JP 2005-004771 A 1/2005

OTHER PUBLICATIONS

Budinsky, F.J., et al., Automatic code generation from design patterns, 1996, pp. 151-171.*

(Continued)

*Primary Examiner* — Thuy Dao
*Assistant Examiner* — Christopher Franco
(74) *Attorney, Agent, or Firm* — Volpe and Koenig, P.C.

(57) ABSTRACT

A device and method automatically generate a program for buffering differences based on characteristics of a component. A buffer program for buffering differences of the way to use a component during different software environments is automatically generated. The device includes a controller for executing automatic generation of the buffer program, a memory including control information and a processing program, an input device for inputting the processing content of the component, and an output device for outputting the automatically generated buffer program. The memory records a plurality of forms for buffering the component as the control information and the controller extracts characteristic information based on the processing content of the component and records the extracted characteristic information as control information in the memory, selects a specified form based on the characteristic information, and generates the buffer program based on the selected form and the characteristic information.

9 Claims, 13 Drawing Sheets

(56) References Cited

U.S. PATENT DOCUMENTS

| | | | |
|---|---|---|---|
| 2006/0259871 A1* | 11/2006 | Washington et al. | 715/763 |
| 2008/0229277 A1* | 9/2008 | Devarakonda et al. | 717/104 |
| 2010/0077393 A1* | 3/2010 | Stelting | 717/176 |
| 2010/0199257 A1* | 8/2010 | Biggerstaff | 717/104 |

OTHER PUBLICATIONS

Kambe, Kazuko et al., Efficient Template Generation for Instruction-Based Self-Test of Processor Cores, 2004, pp. 152-157.*

Estevez, Elisabet et al., Automatic generation of PLC automation projects from component-based models, 2007, pp. 527-540.*

Denney, Ewen et al., Certifiable Program Generation, 2005, pp. 17-28.*

Czarnecki, Krzysztof, Overview of Generative Software Development, 2005, pp. 326-341.*

Dong, Wenli et al., Test Case Generation Method for BPEL-based Testing, 2009, pp. 467-470.*

* cited by examiner

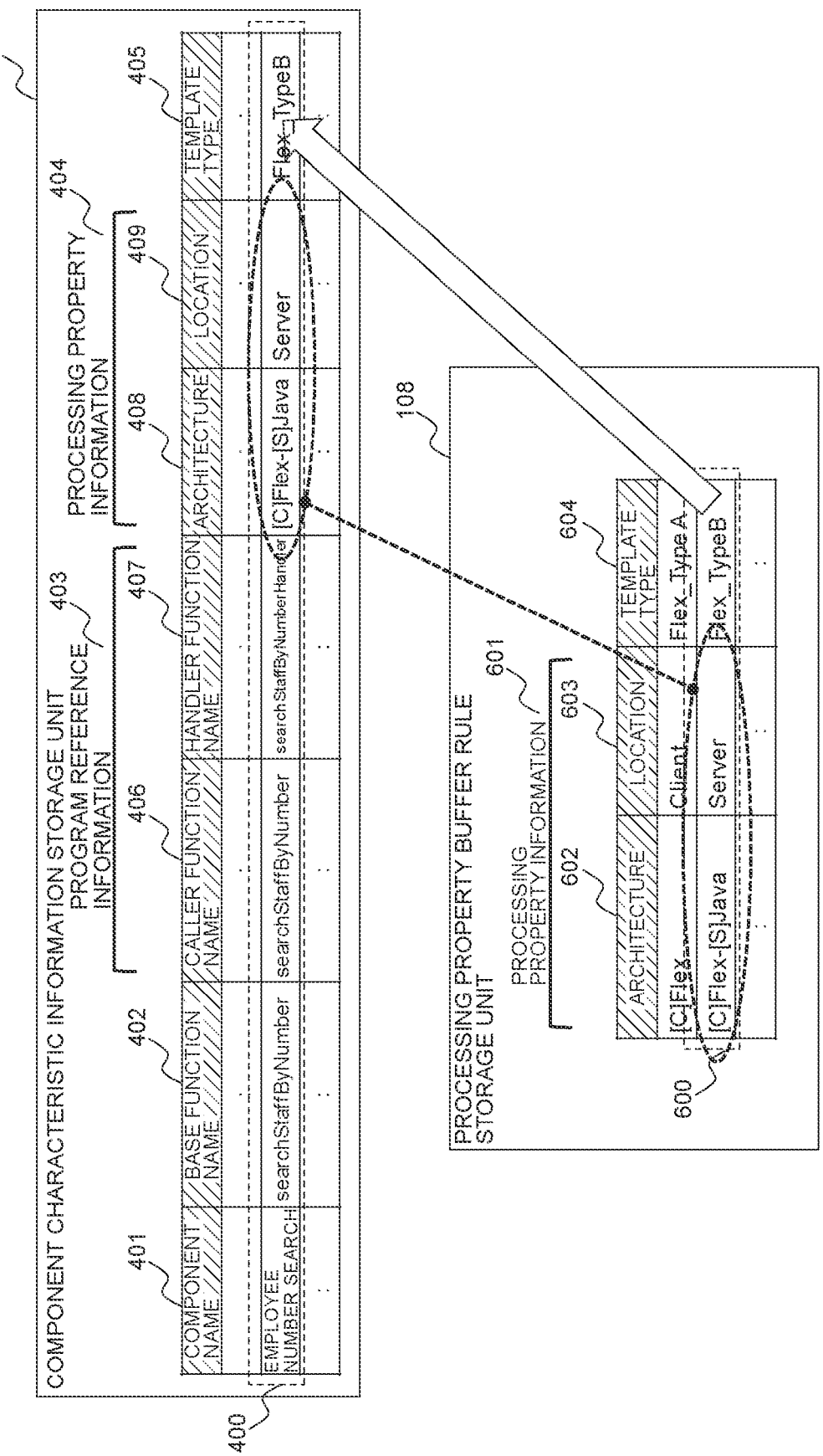

FIG. 8

BUFFER PROGRAM TEMPLATE

| TEMPLATE TYPE | Flex_TypeB |

```
public function [[BASE]]_sync( ev:Event , cont:Function ):void{
    ro = new RemoteObject ();
    :
    ro.addEventListener(    ( ResultEvent.RESULT
        , function( re:ResultEvent ):void{
            [[HANDLER]](re);
            cont( ev );
        });
    this.[[CALLER]]
} public function [[BASE]]_async ( ev:Event , cont:Function ):void{
    ro = new RemoteObject ();
    :
    ro.addEventListener(    ( ResultEvent.RESULT
        , function( re:ResultEvent ):void{
            [[HANDLER]](re);
        });
    this.[[CALLER]]
    cont( ev );
    :
}
```

800

801

802

803

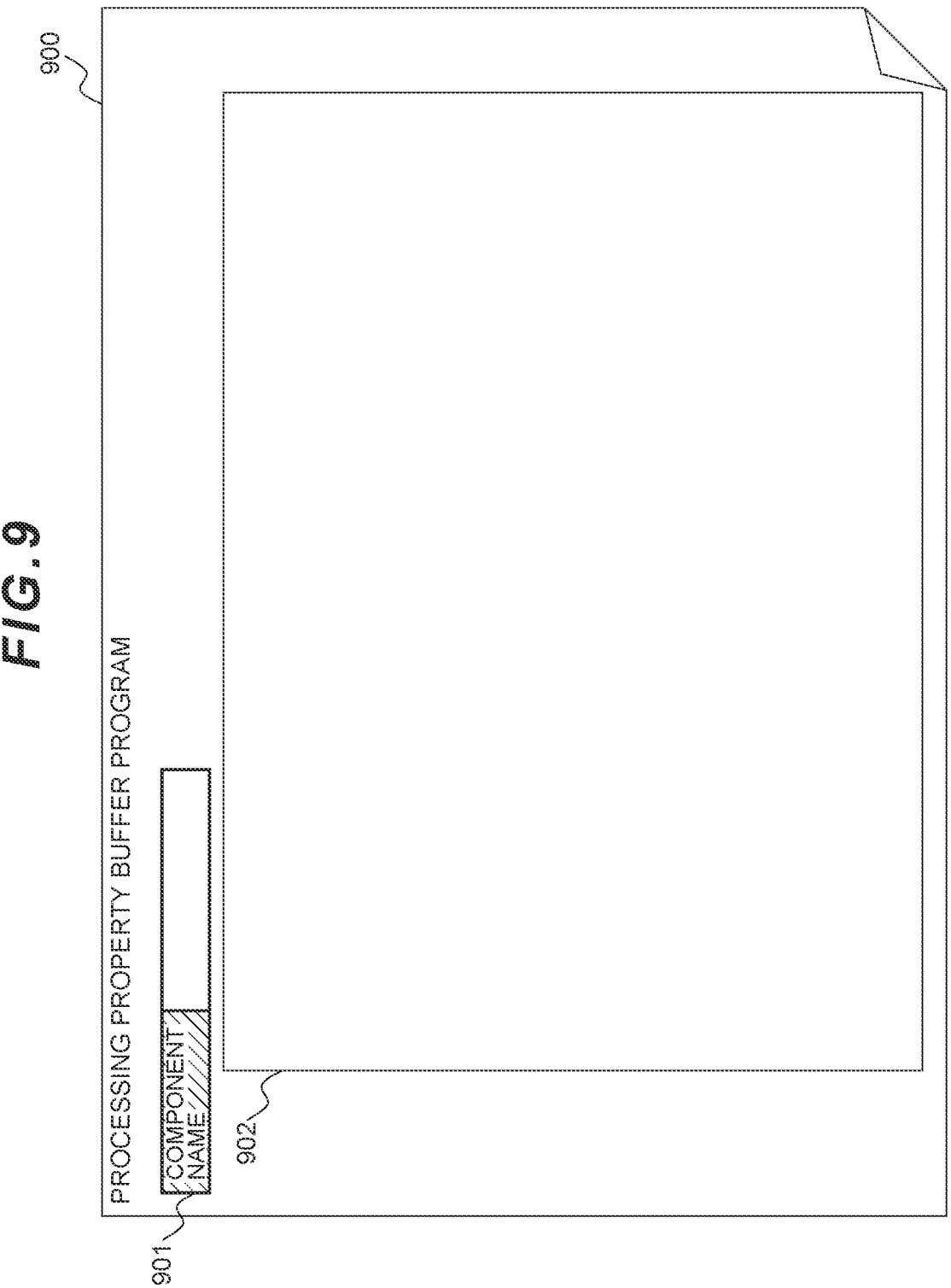

AUTOMATIC PROGRAM GENERATION DEVICE AND AUTOMATIC PROGRAM GENERATION METHOD

CROSS-REFERENCES TO RELATED APPLICATIONS

This application relates to and claims priority from Japanese Patent Application No. 2011-248099, filed on Nov. 11, 2011, the entire disclosure of which is incorporated herein by reference.

BACKGROUND

1. Field of the Invention

The present invention relates to a device and method for automatically generating a program.

2. Description of Related Art

There is a computing system described in, for example, Japanese Patent Application Laid-Open (Kokai) Publication No. 2005-004771 as a conventional example of an automatic program generation device. This conventional system is intended to provide a mechanism enabling the operation of a component under various kinds of application frameworks without having a creator of the component consider problems specific to the application frameworks such as threading/parallel processing; and the conventional system provides a mechanism to remove the differences of the manner to implement asynchronous operations, which is specific to the kind of introduced application frameworks, from the component to implement the processing.

SUMMARY

In some cases, asynchronous operations cannot be implemented, depending on the specification of the application framework; however, the above-described conventional system does not consider dealing with such a case.

As an example of such a case, there is an application framework of client-server system that realizes a client-side system by using Adobe Flex (registered trademark) and realizes a server-side system by using Java (registered trademark). While processing including communications between client side and server side can be implemented as an asynchronous operation, processing completed only on the client side cannot be normally implemented as an asynchronous operation.

Furthermore, the above-mentioned system does not consider anything other than execution sequences of processing as a cause to make the manner to implement components different during different application frameworks. Specifically speaking, interfaces for the operation and other differences cannot be removed from the component.

Because of the reason described above, for example, a component and a program using the component lose their reusability in a scene where an application framework for realizing software and a software architecture under the application framework is changed or in a scene where software is created for a plurality of application frameworks and software architectures. This problem may result in a forced replacement of a certain component with another component having an equivalent function and a forced change of a processing flow using the component.

So, it is an object of the present invention to provide a user of a component with a device and method for automatically generating a program for buffering differences of the way to use a component for implementation during different software environments, such as architectures or frameworks, considering characteristics and usages of the component.

In order to achieve the above-described object, an automatic program generation device according to the present invention is characterized in that the differences of the way to use a component are buffered according to the software environment so as to make them match the software environment where the component is used.

An automatic program generation device for automatically generating a program for buffering differences of the way to use a component(s) for implementation during different software environments where the component is used is provided an aspect of the present invention, and the automatic program generation device includes: a controller for executing automatic generation of the buffer program; a memory including control information and a processing program for automatic generation of the buffer program; an input device for inputting processing content of the component; and an output device for outputting the automatically generated buffer program; wherein the memory records a plurality of forms for buffering the component as the control information; and wherein according to the processing program, the controller: extracts characteristic information based on the processing content of the component, which has been input, and records the extracted characteristic information as the control information in the memory; reads the extracted characteristic information and the plurality of forms from the control information of the memory and selects a specified form from the plurality of forms based on the characteristic information; and generates the buffer program based on the selected form and the characteristic information.

A device and method for automatically generating a program for buffering differences of the way to use a component for implementation during different software environments, such as architectures and frameworks, where the component is used can be provided to a user of the component according to the present invention.

BRIEF DESCRIPTION OF THE DRAWINGS

FIG. 7 is a logical block diagram for explaining the operation to decide a template type of a buffer program based on the component characteristic information.

FIG. 8 is a logical block diagram showing the structure of a template for the buffer program.

FIG. 9 is a logical block diagram of a processing property buffer program image for buffering the processing property of the component.

DETAILED DESCRIPTION OF PREFERRED EMBODIMENTS

Figure 1:
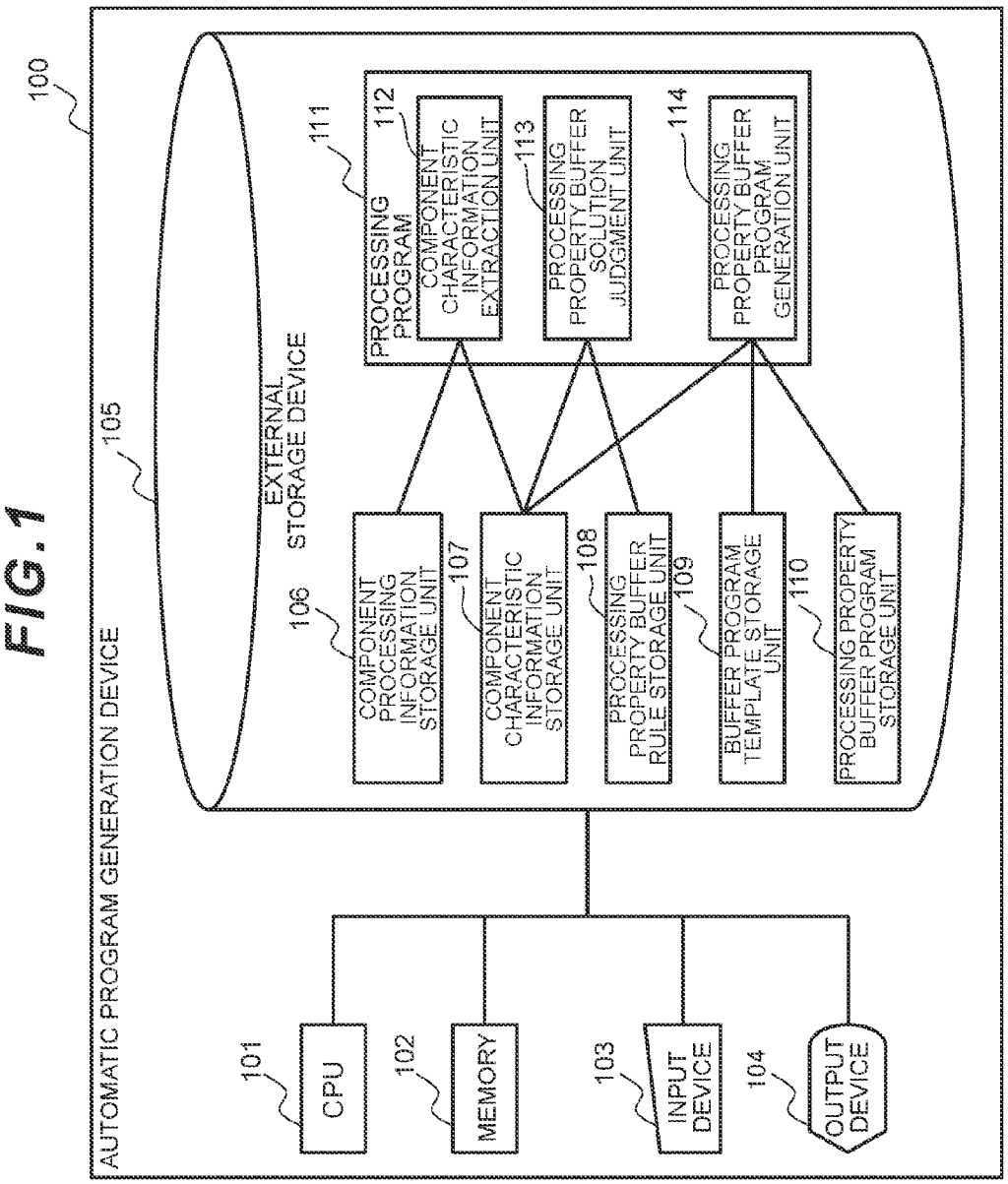
FIG. 1 is a block configuration diagram of an automatic program generation device according to one embodiment.

Next, an embodiment of the present invention will be explained with reference to the attached drawings. An automatic program generation device generates a program for buffering differences of implementation of a component as an embodiment for automatic program generation. FIG. 1 is a block diagram showing a hardware structure and logical structure of the automatic program generation device according to an embodiment. An automatic program generation device 100 includes a CPU 101, a memory 102, an input device 103, an output device 104, and an external storage device 105.

The external storage device 105 retains a component processing content storage unit (area) 106, a component characteristic information storage unit (area) 107, a processing property buffer rule storage unit (area) 108, a buffer program template storage unit (area) 109, and a processing property buffer program storage unit (area) 110; and also has a processing program 111.

The processing program 111 executes a component characteristic information extraction (processing) unit 112, a processing property buffer system judgment (processing) unit 113, and a processing property buffer program generation (processing) unit 114. The processing program 111 is read into the memory 102 upon execution and is then executed by the CPU 101.

A processing property buffer rule and a buffer program template are input by the user in advance to the processing property buffer rule storage unit 108 and the buffer program template storage unit 109. The details of the processing property buffer rule and the buffer program template will be explained later.

The processing content of the component, which was externally input via the input device, is written to the component processing content storage unit 106. The component characteristic information extraction unit 112 extracts the characteristics of the component from the processing content of the component, which was read from the component processing content storage unit 106, and writes them to the component characteristic information storage unit 107.

The processing property buffer system judgment unit 113 refers to the processing property buffer rule, which was read from the processing property buffer rule storage unit 108, and selects a processing property buffer system corresponding to the component characteristic information which was read from the component characteristic information storage unit 107, thereby complementing the component characteristic information.

The component buffer program generation unit 114 refers to the component characteristic information, which was read from the component characteristic information storage unit 107, reads a buffer program template corresponding to the selected buffer system from the buffer program template storage unit 109, and writes it as a processing property buffer program to the processing property buffer program storage unit 110. Furthermore, the component buffer program generation unit 114 refers to the component characteristic information and complements the processing property buffer program, thereby completing the processing property buffer program.

Figure 2:
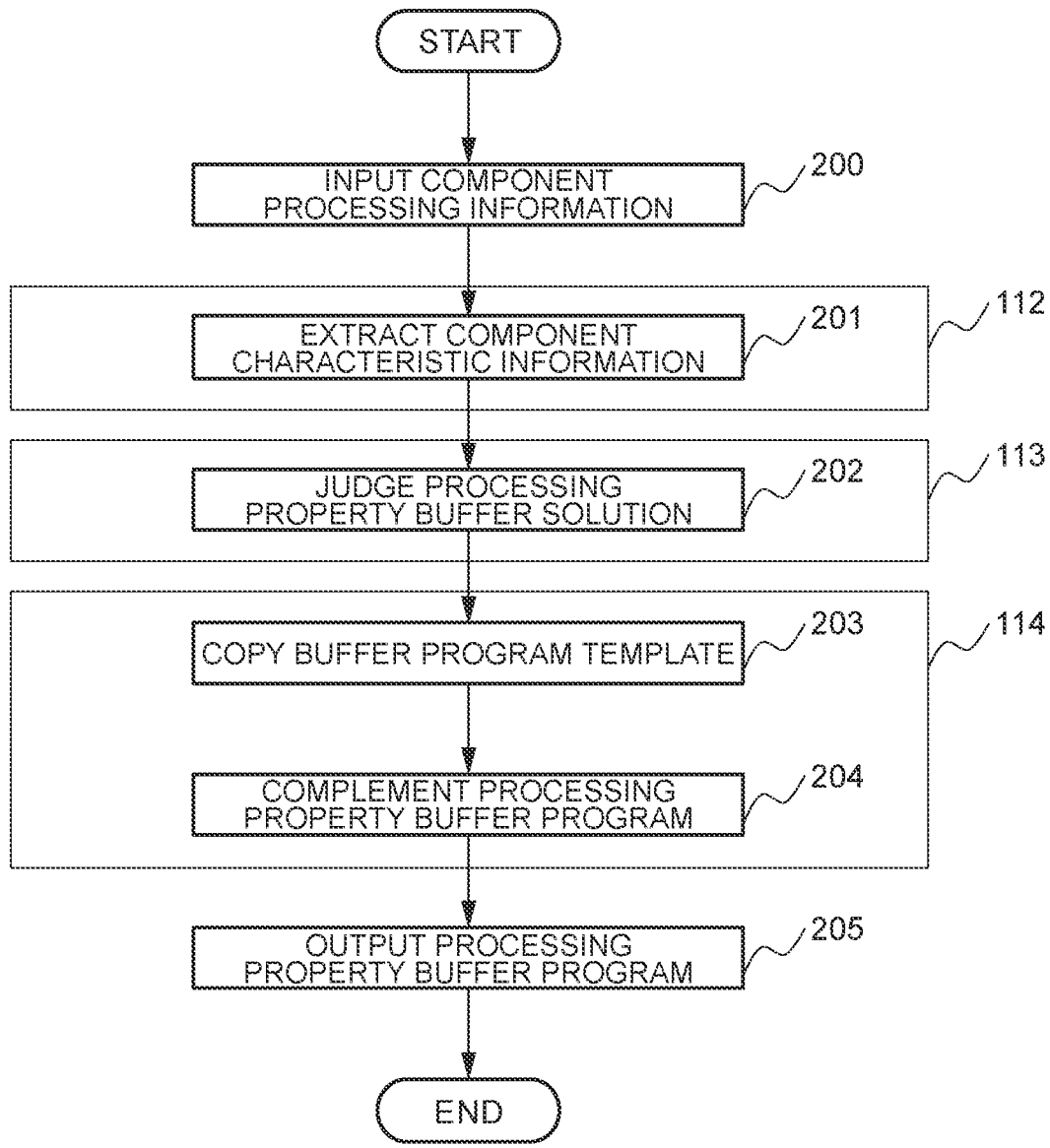
FIG. 2 is a flowchart explaining automatic program generation by the automatic program generation device.

FIG. 2 is an example of a flowchart for explaining processing of the automatic program generation device. The operation of each element in FIG. 1 will be explained with reference to the flowchart in FIG. 2. Step 200 is a step of inputting the processing content of the component as input of design information to an automatic program generation tool. The input operation is performed by a developer. In step 200, the processing content of the component which was input from the input device 103 is written to the component processing content storage unit 106.

The processing content of the component is information defining a means for realizing predetermined specific processing, such as operations relating to business data and screen displays, or a program for realizing the means. Information relating to calls such as timing to call the relevant processing during the execution of an application may not be retained. A specific example of the processing content of the component is shown in FIG. 3.

The component processing content 300 retains a component name 301, an architecture structure 302 for which the component is used, and a component location 303 in the architecture, as well as a call processing name 304 as an entity of processing of the component, call processing content 305, a handler processing name 306, and handler processing content 307.

Figure 3:
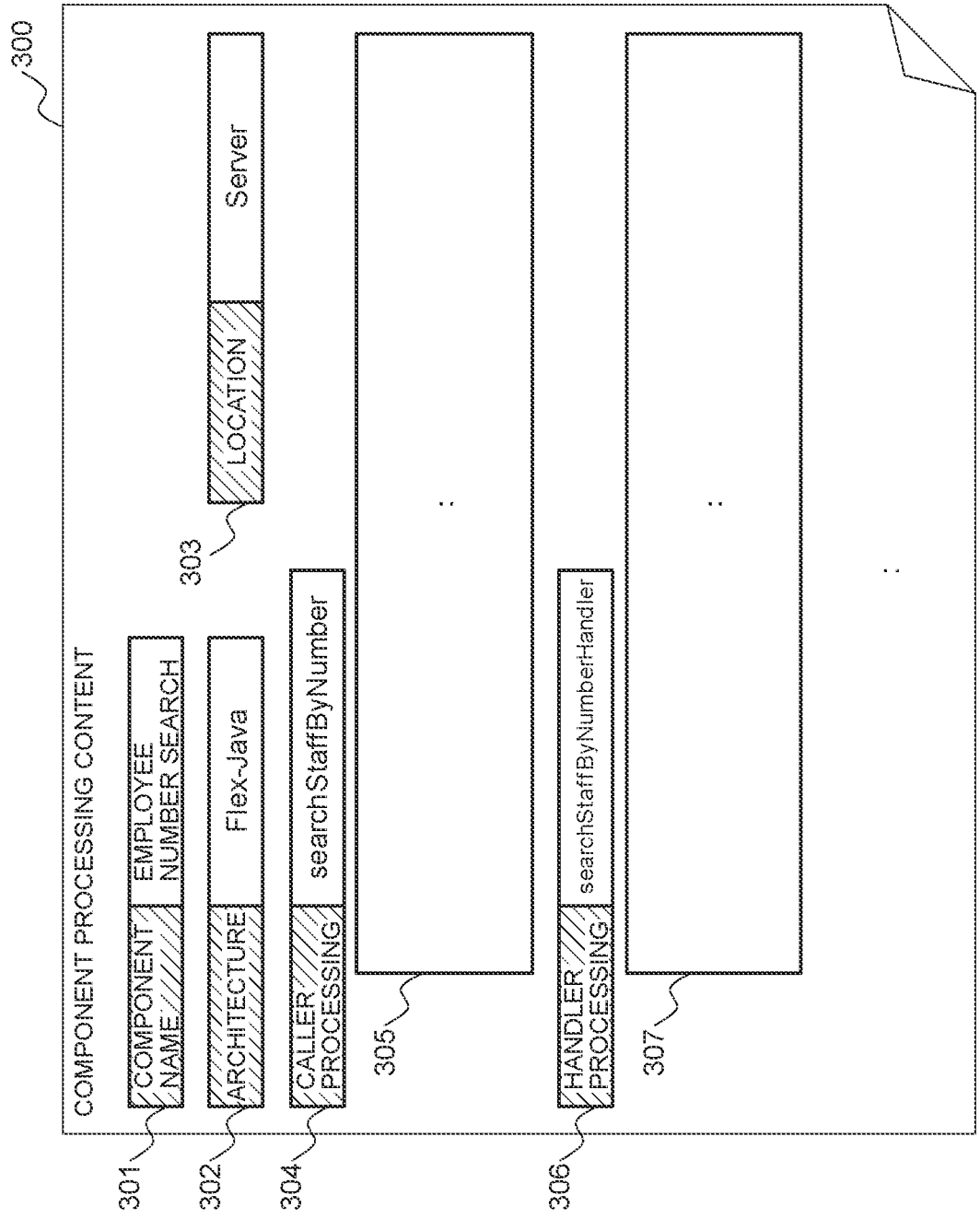
FIG. 3 is a logical block diagram of component processing content according to an embodiment.

Referring to FIG. 3, the component processing content 300 is definition information, but it may be a program. In the latter case, the pieces of information 301 to 306 become meta information or take a form that enables static analysis and discrimination of the program. These pieces of information are configured so that they could be extracted by a mechanical means as described later.

Steps 201 to 204 in FIG. 2 are examples of mechanical processing based on the input information and are processing that can be implemented only by the automatic program generation device without any manual assistance. In step 201, the component characteristic information extraction unit 112 reads the component processing content from the component processing content storage unit 106 and extracts the component characteristic information. The extracted component characteristic information is written to the component characteristic information storage unit 107.

The component characteristic information herein mentioned is information about implementation of the component including information that affects how the component behaves and how to call the component when a program equipped with the component is executed. The type of such influential information differs according to application frameworks. Also, the type of such influential information differs depending on the viewpoint of buffering the differences of behaviors of the component. This embodiment is characterized by the viewpoint of buffering the differences of the execution sequence including differences of synchronous processing/asynchronous processing of the component. A specific example of a schema of the component characteristic information is shown in FIG. 4.

Figure 4:
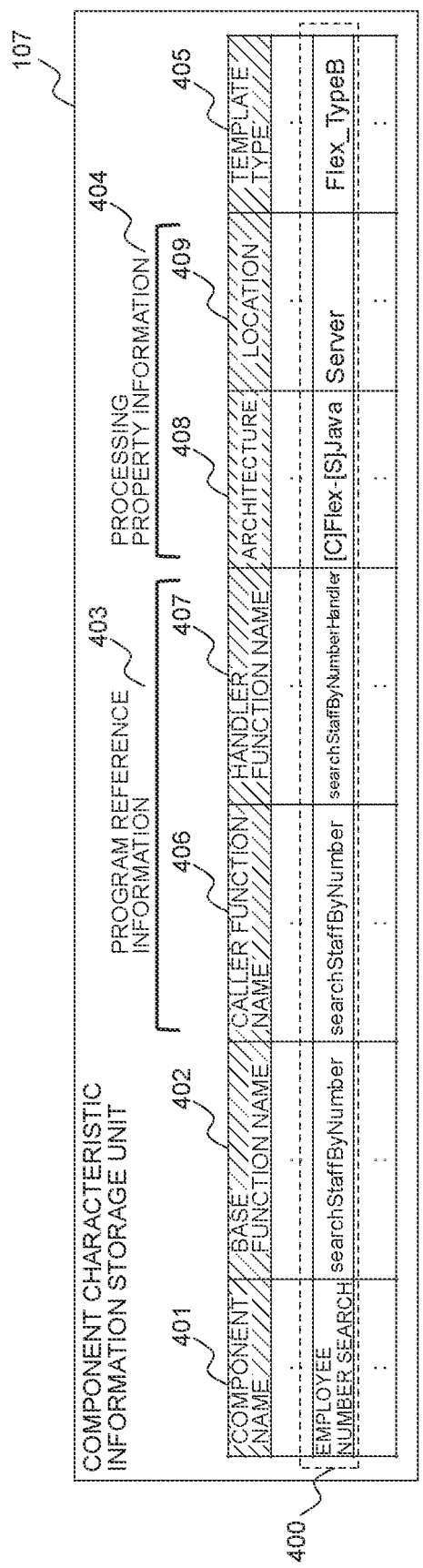
FIG. 4 is a logical block diagram of characteristic information of the component processing content.

FIG. 4 is an example of the component characteristic information. Component characteristic information 400 includes: a component name 401 which is information for identifying the corresponding component processing content; a basic function name 402 which is information for identifying the corresponding buffer program; program reference information 403 for identifying the component in the application framework; processing property information 404 which is information characterizing how the component behaves and how to call the component; and a template type 405 which is information for identifying a template of the program for buffering the properties of the component. These pieces of characteristic information are one example.

The program reference information 403 is composed of a call function name 406 and a handler function name 407; and the processing property information 404 is composed of architecture structure information 408 and component location information 409.

When extracting the component characteristic information, the component characteristic information extraction unit 112 firstly selects one of the component processing content retained by the component processing content storage unit 106.

Next, the component characteristic information extraction unit 112 extracts necessary information from the selected component processing content and inputs it to a corresponding location in the component characteristic information retained by the component characteristic information storage unit 107. The component characteristic information extraction unit 112 completes step 202 by performing the operation to extract the component characteristic information with respect to the entire component processing content retained by the component processing content storage unit 106. A specific example of a method for extracting the component characteristic information from the component processing content is shown in FIG. 5.

Figure 5:
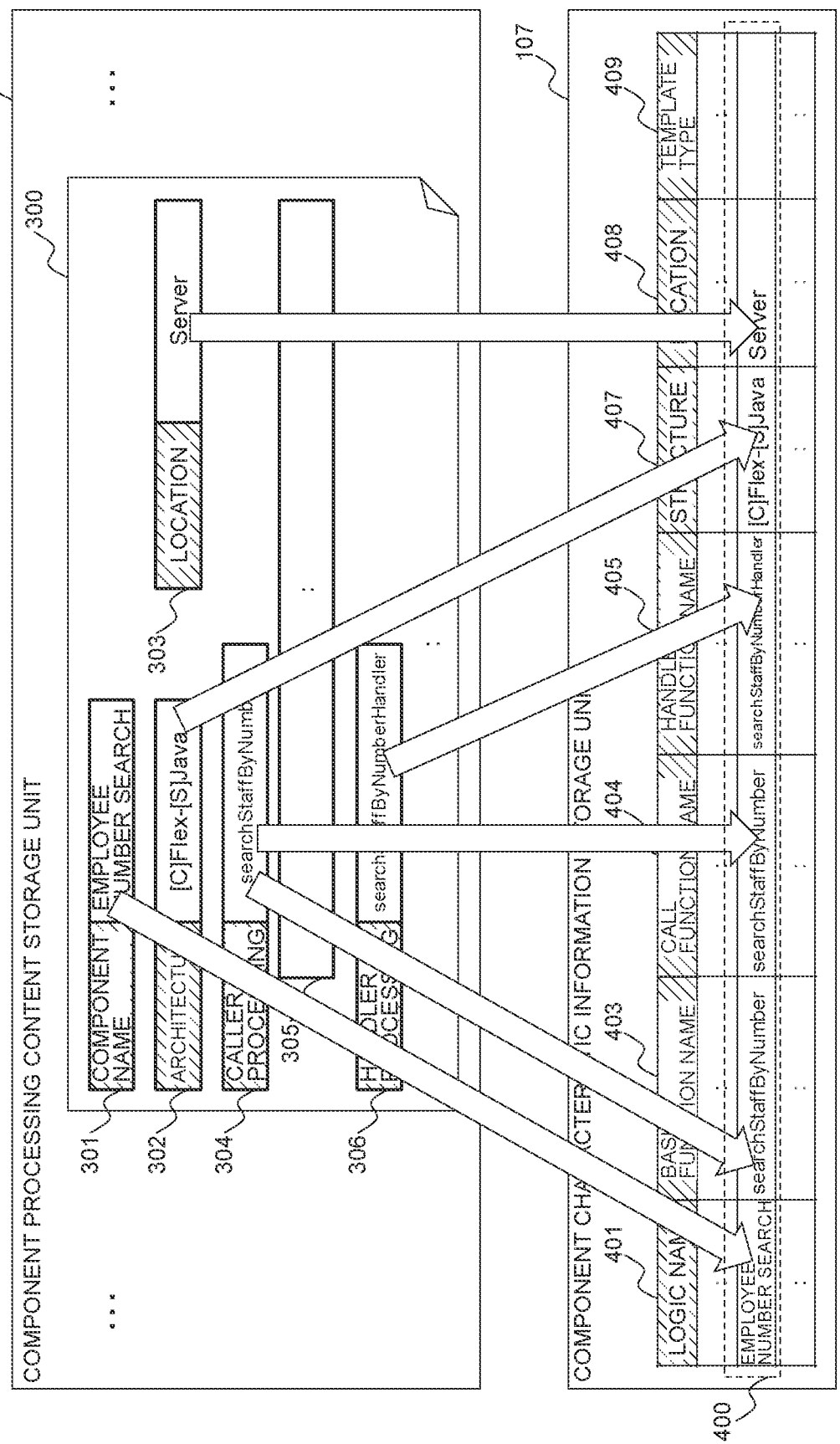
FIG. 5 is a logical block diagram for explaining the operation to extract component characteristic information from the component processing content.

FIG. 5 shows an image of processing for extracting basic information from the component characteristic information. The component characteristic information extraction unit 112 obtains the component name 401 from the component name 301 retained by the selected component processing content 300, the architecture structure information 408 from the architecture structure information 302, the component location information 409 from the component location information 303, the call function name 406 from the call processing name 304, and the handler function name 407 from the handler processing name 306, respectively; and writes them to the component characteristic information storage unit 107. The information of the call processing name 304 is written to the basic function name 402. Incidentally, no information needs to be input to the template type 405 in step 201.

In step 202, the processing property buffer system judgment unit 113 judges a processing property buffer system corresponding to the component characteristic information by referring to the processing property buffer rule read from the processing property buffer rule storage unit 108 and searching for the template type corresponding to the component characteristic information read from the component characteristic information storage unit 107. Information of the template type found by the search is written as part of the component characteristic information to the component characteristic information storage unit 107.

Figure 6:
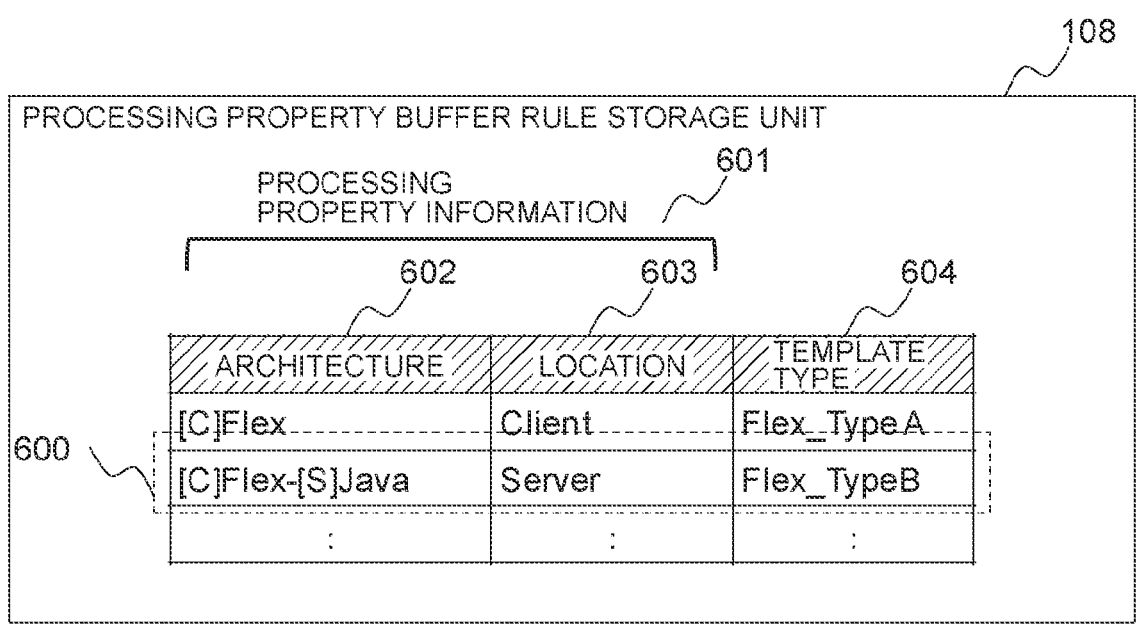
FIG. 6 is a block diagram of a processing property buffer rule for a component according to an embodiment.

The processing property buffer rule is information classifying methods for buffering the differences of how the component behaves and how to call the component with respect to each piece of the processing property information of the component. A specific example of the processing property buffer rule is shown in FIG. 6.

A processing property buffer rule 600 is composed of a combination of processing property information 601, which is information characterizing how the program behaves and how to call the program, and a template type 604 which is information indicating classification of a method for buffering the characteristics of the processing property information 601. The processing property information 601 is composed of, for example, architecture structure information 602 and component location information 603; and is structured in such a form that the processing property information 601 is associated with the processing property information 404 retained by the component characteristic information.

Upon the judgment of the processing property buffer system, the processing property buffer system judgment unit 113 firstly selects one piece of the component characteristic information retained by the component characteristic information storage unit 107. Next, the processing property buffer system judgment unit 113 searches for a processing property buffer system corresponding to the selected component characteristic information by referring to the processing property buffer rule retained by the processing property buffer rule storage unit 108.

Subsequently, information of the component buffer system found by the search is recorded as part of the selected component characteristic information. The processing property buffer system judgment unit 113 searches for and records the processing property buffer system for all pieces of the component characteristic information retained by the component characteristic information storage unit 107, thereby terminating step 202.

A specific example of how the processing property buffer system judgment unit 113 searches for and records the processing property buffer system is shown in FIG. 7. FIG. 7 shows an image of processing for extracting the information of the template type from the component characteristic information.

The processing property buffer system judgment unit 113 firstly searches the processing property buffer rule storage unit 108 for the processing property buffer rule 600 corresponding to the selected component characteristic information 400. The correspondence relationship is judged by the processing property buffer system judgment unit 113 by comparing the processing property information 404 of the component characteristic information 400 with the processing property information 601 of the processing property buffer rule 600, for example, based on how the respective values are related to each other or whether those values are the same or not. In this embodiment, it is determined that the pieces of information with the same architecture structure and the same component location are associated with each other. Next, the processing property buffer system judgment unit 113 writes the information of the template type 604 of the processing property buffer rule 600 to the template type 405 of the selected component characteristic information 400.

In step 203, the processing property buffer program generation unit 114 refers to the component characteristic information read from the component characteristic information storage unit 107, reads the corresponding buffer program template from the buffer program template storage unit 109, and writes it as a processing property buffer program to the processing property buffer program storage unit 110. The processing property buffer program generation unit 114 reads buffer program templates with respect to all pieces of the component characteristic information retained by the component characteristic information storage unit 107 and records them in the processing property buffer program storage unit 110, thereby completing step 203.

The buffer program template is a format of a wrapper program, which is prepared for each property of how a certain component or program behaves or how to call the component or program, for concealing, reducing, or buffering the property. The processing property buffer program is a wrapper program for concealing, reducing, or buffering the characteristics of how a certain component or program behaves or how to call the component or program. The processing property buffer program generation unit 114 buffers the differences between them.

A specific example of the buffer program template is shown in FIG. 8 and a specific example of the processing property buffer program is shown in FIG. 9, respectively. Information corresponding to the template types 604 of all the processing property buffer rules recorded in the processing property buffer rule storage unit 108 are prepared in advance as a buffer program template 800 and input to the buffer program template storage unit 109. The buffer program template 800 retains a template type 801 which is information associated with the template type 604 of the processing property buffer rule, and a program piece 802.

The program piece 802 is a source code of a programming language for each application framework supported by the template type 801. Part of the program piece 802 constitutes a buffer target area such as an alternate text 803. The alternate text 803 is a character string of a format that can be easily distinguished from the program piece 802 by mechanical syntactical analysis processing. As shown in FIG. 9, a processing property buffer program 900 retains a component name 901, which is information for identifying the corresponding component, and a program piece 902.

Regarding identification of the processing property buffer program template, that is, reading of information from the buffer program template storage unit 109 and writing of information to the processing property buffer program storage unit 110, the processing property buffer program generation unit 114 firstly selects one piece of the component characteristic information retained by the component characteristic information storage unit 107.

The processing property buffer program generation unit 114 creates the processing property buffer program 900 corresponding to the selected component characteristic information and writes it to the processing property buffer program storage unit 110. Next, the processing property buffer program generation unit 114 searches the buffer program template storage unit 109 for a buffer program template corresponding to the selected component characteristic information, copies information of that program piece, and writes it to the program piece 902 of the created processing property buffer program 900. The processing property buffer program generation unit 114 creates the processing property buffer program and writes the information of the program piece with respect to all pieces of the component characteristic information retained by the component characteristic information storage unit 107, thereby terminating step 203.

Figure 10:
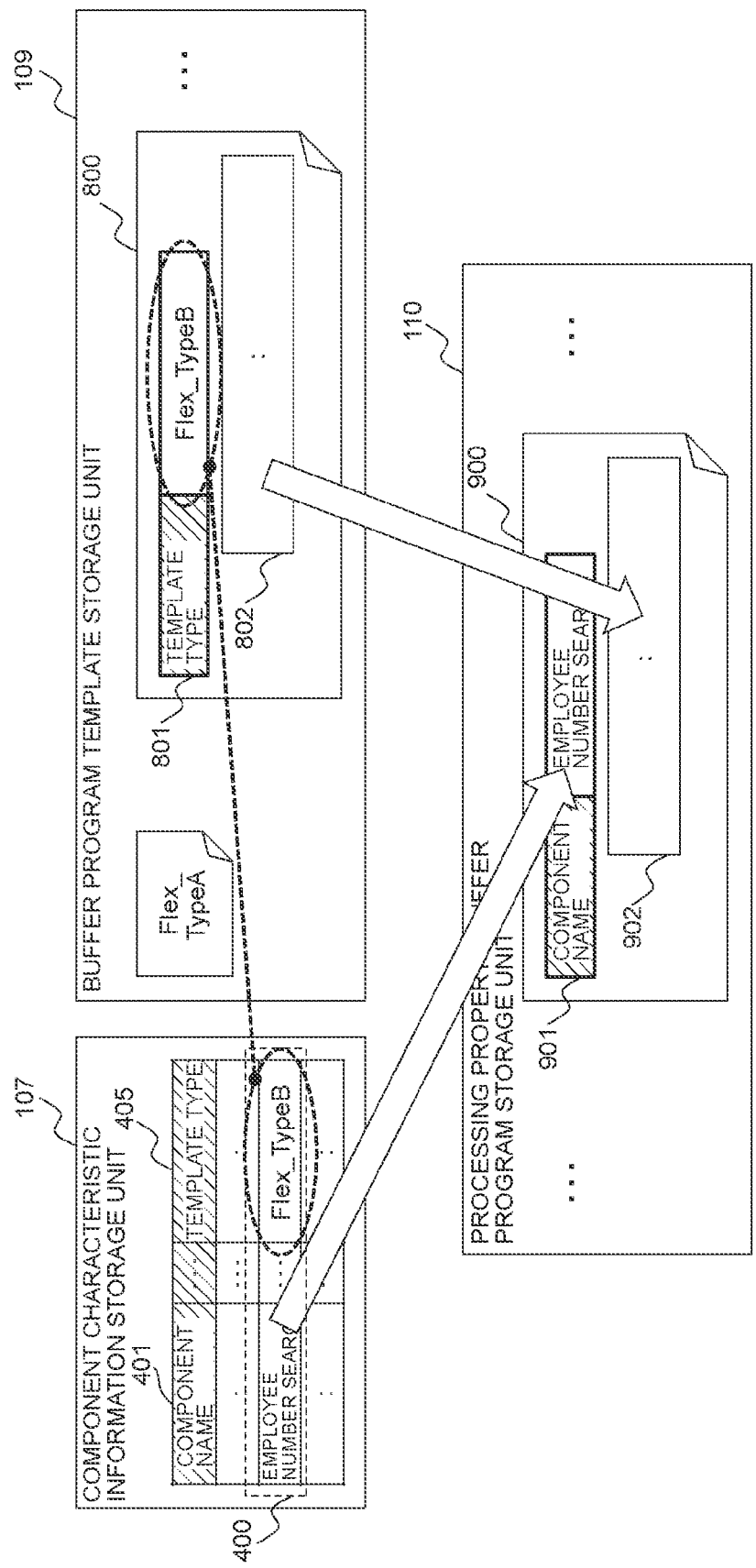
FIG. 10 is a logical block diagram for explaining the operation to extract specific information from the component characteristic information and the template for the buffer program and writes it to a processing property buffer program.

A specific example of creation and writing of the processing property buffer program is shown in FIG. 10. FIG. 10 shows an image of extracting basic information of the processing property buffer program 900 from the component characteristic information storage unit 107 and the buffer program template storage unit 109. The processing property buffer program generation unit 114 firstly creates the processing property buffer program 900 by using the component name 401 of the selected component characteristic information 400 as the component name 901 and writes it to the processing property buffer program storage unit 110.

Next, the processing property buffer program generation unit 114 refers to the template type 405 of the selected component characteristic information 400 and selects the buffer program template 800, which has the same information of the template type 801 as the template type 405, from the buffer program template storage unit 109. Then, the processing property buffer program generation unit 114 copies the information of the program piece 802 of the selected buffer program template 800 and writes it as the program piece 902 of the processing property buffer program 900 created as described earlier to the processing property buffer program storage unit 110.

In step 204, the processing property buffer program generation unit 114 reads one piece of the component characteristic information from the component characteristic information storage unit 107 and searches the processing property buffer program storage unit 110 for the processing property buffer program corresponding to such component characteristic information.

The processing property buffer program generation unit 114 further refers to the information of the component characteristic information 400 and complements the information of the processing property buffer program, thereby completing the processing property buffer program. The processing property buffer program generation unit 114 complements the processing property buffer program with respect to all pieces of the component characteristic information retained by the component characteristic information storage unit 107, thereby completing step 204.

Figure 11:
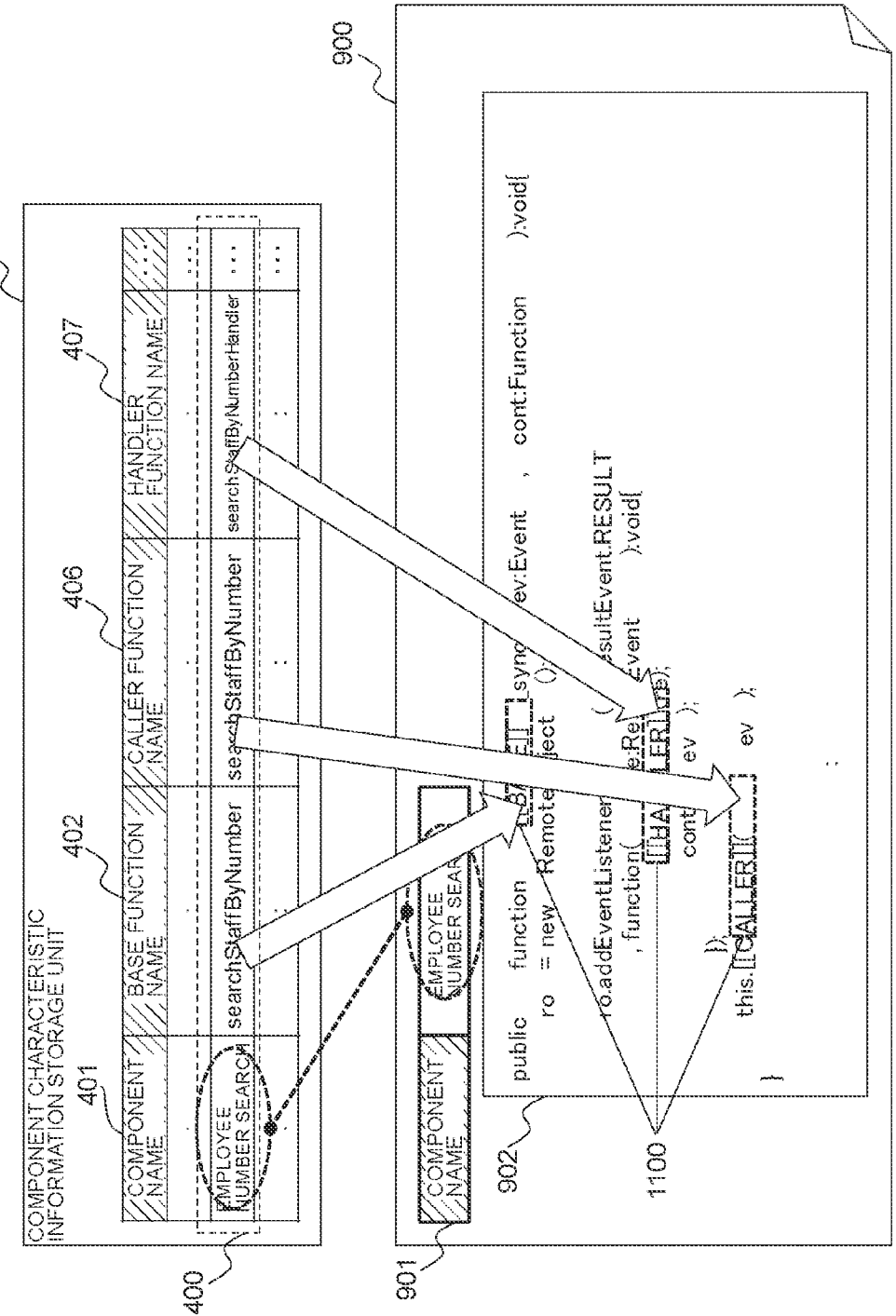
FIG. 11 is a logical block diagram for explaining the operation to complement deficient information of the processing property buffer program based on the component characteristic information.

FIG. 11 illustrates an image of processing for complementing deficient information of the processing property buffer program. The processing property buffer program generation unit 114 firstly searches the processing property buffer program storage unit 110 for the processing property buffer program 900 having the same component name 901 as the component name 401 of the selected component characteristic information 400 and reads such processing property buffer program 900.

Then, the processing property buffer program generation unit 114 replaces an alternate text 1100 of the program piece 902 belonging to the processing property buffer program 900, which has been read, with the selected component characteristic information 400. The alternate text 1100 was the alternate text 803 which is part of the program piece 802 of the copy source in step 203, and is described so that it could be clearly distinguished from other parts of the program piece 902.

Regarding the tentative text 1100, the processing property buffer program generation unit 114 replaces the text written as [BASE] with the basic function name 402, the text written as [CALLER] with the call function name 406, the text written as [HANDLER] with the handler function name 407, respectively, thereby determining all the parts which were the tentative text 1100 and completing the program piece.

Step 205 is a step in which the developer obtains the processing property buffer program, which was generated by the automatic program generation device 100, via the output device 104. The automatic program generation device 100 reads the processing property buffer program from the processing property buffer program storage unit 110 and outputs it to the output device 104 in accordance with the developer's instruction. Furthermore, if the automatic program generation device 100 fails to generate the processing property buffer program due to, for example, insufficient input, it may output information for notifying the developer to that effect. Incidentally, the notice may be output as text data or binary data so that it could be treated by computers; or letters or graphics may be displayed on a monitor so that they could be viewed by the developer.

Figure 12:
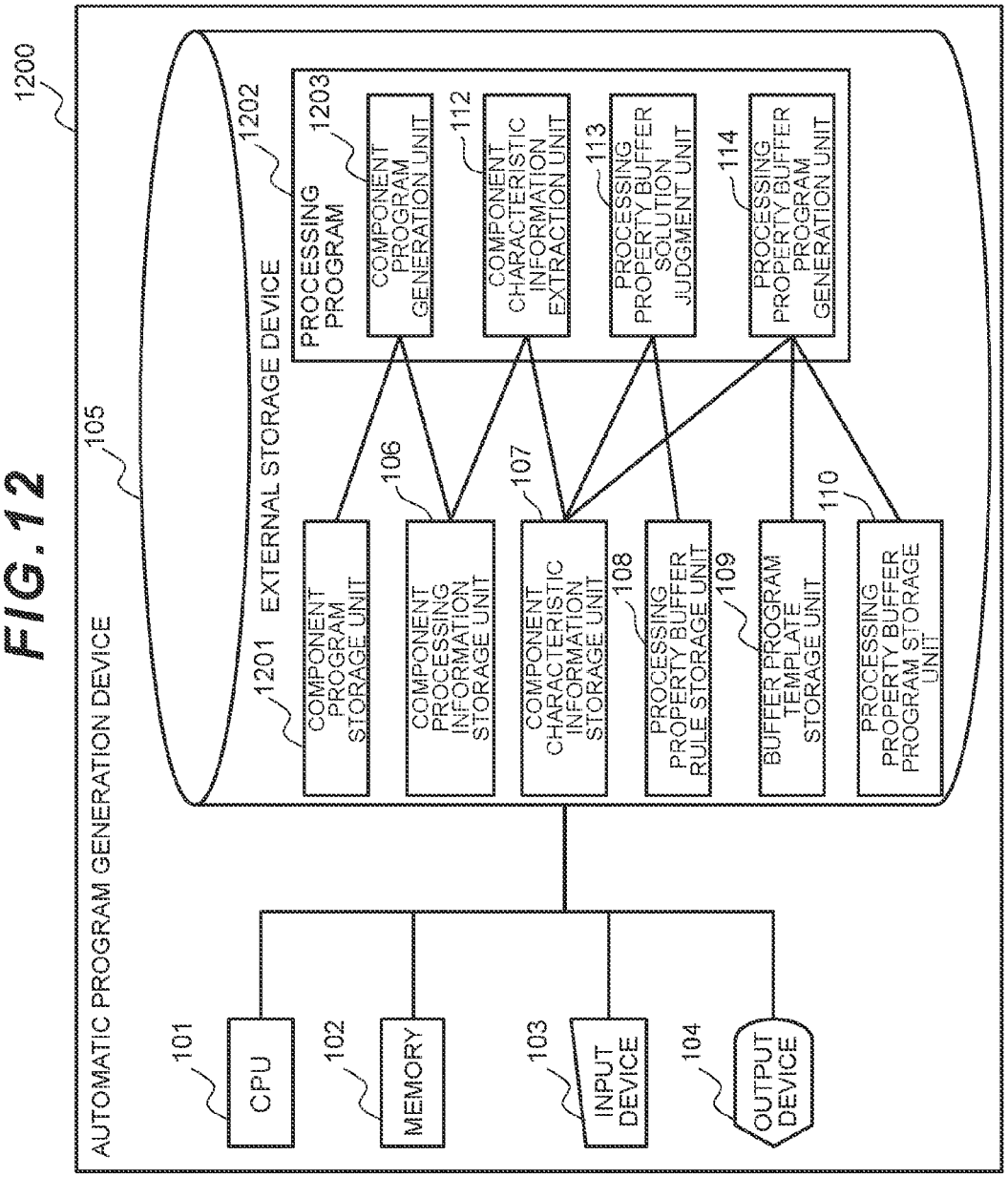
FIG. 12 is a logical block diagram showing an automatic program generation device according to a second embodiment.

Next, a second embodiment will be explained. An automatic program generation device according to this embodiment generates not only a program for buffering the differences of implementation of a component, but also a program of the component itself. FIG. 12 shows a block configuration diagram of this automatic program generation device. An automatic program generation device 1200 retains a component program storage unit 1201 in addition to the structure elements of the automatic program generation device 100 according to the first embodiment. Then, a processing program 1202 retains a component program generation unit 1203 in addition to the structure elements of the processing program 111 according to the first embodiment. Upon the execution, the processing program 1202 is read into the memory 102 and executed by the CPU 101.

A processing property buffer rule and a buffer program template are input in advance to the processing property buffer rule storage unit 108 and the buffer program template storage unit 109, respectively. The details of the processing property buffer rule and the buffer program template may be the same as those in the first embodiment or different from those in the first embodiment.

The component processing content, which was externally input via the input device 103, is written to the component processing content storage unit 106. The component characteristic information extraction unit 112 extracts the characteristics of the processing content from the component processing content read from the component processing content storage unit 106 and writes it to the component characteristic information storage unit 107. The processing property buffer system judgment unit 113 refers to the processing property buffer rule read from the processing property buffer rule storage unit 108 and selects a processing property buffer system corresponding to the component characteristic information read from the component characteristic information storage unit 107, thereby complementing the component characteristic information.

The component buffer program generation unit 114 refers to the component characteristic information read from the component characteristic information storage unit 107, reads a buffer program template corresponding to the selected buffer system from the buffer program template storage unit 109, and writes it as a processing property buffer program to the processing property buffer program storage unit 110. Furthermore, the component buffer program generation unit 114 refers to the component characteristic information and complements the processing property buffer program, thereby completing the processing property buffer program.

The component program generation unit 1203 reads the component processing content from the component processing content storage unit 106 and creates a component program, and then writes it to the component program storage unit 1201.

Figure 13:
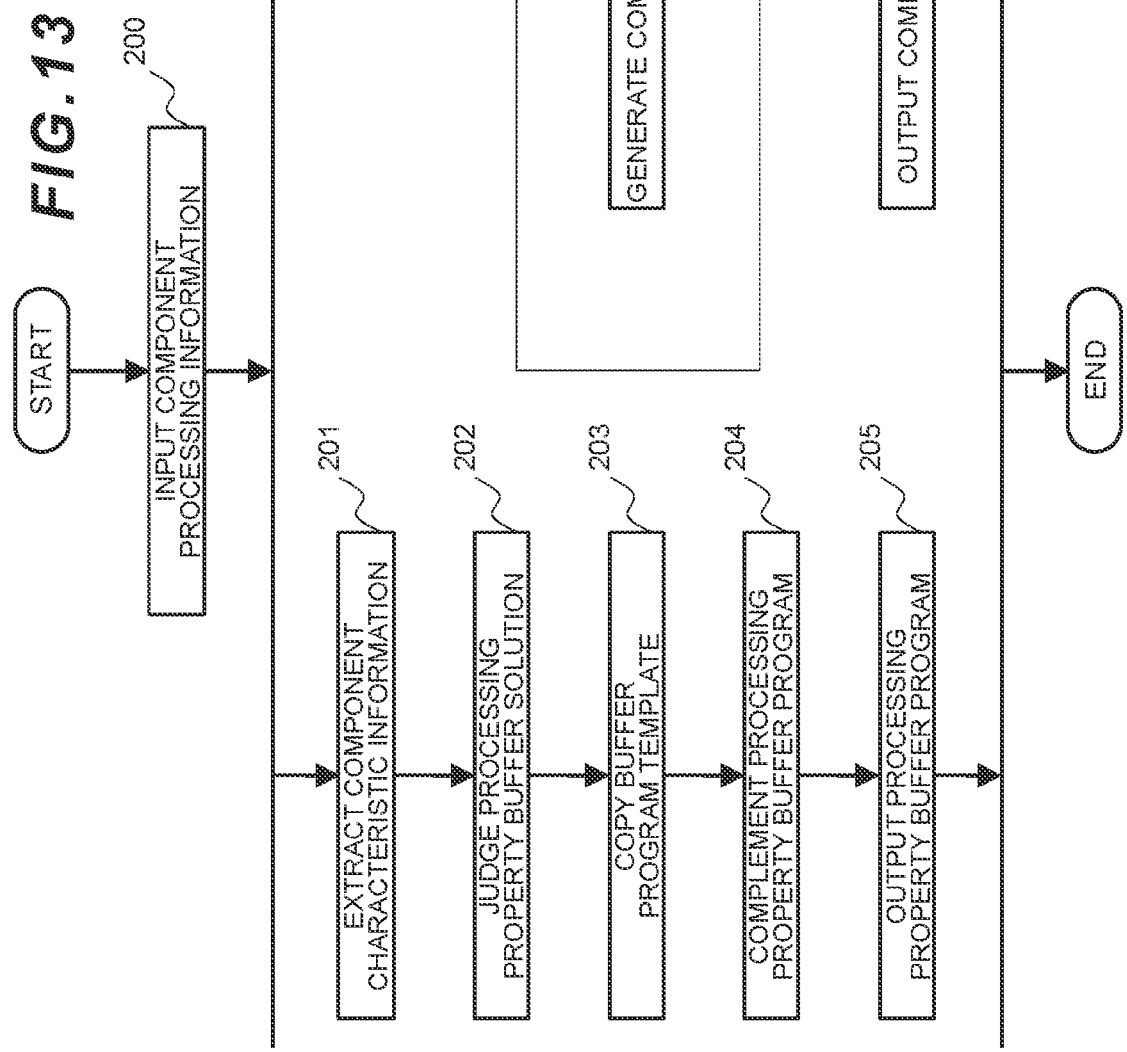
FIG. 13 is a flowchart illustrating the operation of the automatic program generation device according to the second embodiment.

FIG. 13 is an example of a flowchart for explaining processing of the automatic program generation device according to this embodiment. Steps 200 to 205 are the same as those in the first embodiment described earlier. In step 1301, the component program generation unit 1203 reads the component processing content from the component processing content storage unit 106, creates a component program based on that information, and writes it to the component program storage unit 1201. The component program is created and written with respect to the entire component processing content retained by the component processing content storage unit 106, thereby completing step 1301.

The component processing content is assumed to be information of the format shown in FIG. 3 in the same manner as in the first embodiment. The component program generation unit 1203 creates an interface of the component by using the call processing name 304 and the handler processing name 306 of the component processing content 300 and creates a program entity by using the call processing content 305 and the handler processing content 307. If the call processing content 305 and the handler processing content 307 do not have a sufficient amount of information to generate the program, the component program generation unit 1203 may complete creating the component program by creating only the interface of the component program.

Step 1302 is a step in which the developer obtains the component program, which was generated by the automatic program generation device 1200, via the output device 104. The automatic program generation device 1200 reads the component program from the component program storage unit 1201 and outputs it to the output device 104 in accordance with the developer's instruction. Furthermore, if the automatic program generation device 1200 fails to generate the component program due to, for example, insufficient input, it may output information for notifying the developer to that effect. Incidentally, the notice may be output as text data or binary data so that it could be treated by computers; or letters or graphics may be displayed on the monitor so that they could be viewed by the developer.

This embodiment may be designed so that the component program generation unit 1300 obtains the interface information of the component by referring to the characteristic information of the component and generates a skeleton program of the component from the interface information.

Moreover, the component characteristic information extraction unit 112 may also obtain information about the processing entity of the component according to the characteristic information of the processing of the component and the component program generation unit 1300 may generate a component program by referring to the information about the processing entity of the component. Furthermore, the component program generation unit 1300 may judge whether the component already exists or not, when generating the program; and if the component already exists, it may execute previously designated alternate processing for, for example, stopping merging or generating the component program.

According to the above-explained embodiment of the automatic program generation, the differences based on the characteristics of the component can be buffered for the user of the component on the basis of the differences of the software environment, such as architectures and frameworks, where the component is used. Furthermore, it is possible to provide the user of the component with an automatic program generation device and method for providing an interface regarding which the characteristics of the component in using the component would not differ according to the differences of the software environment. Accordingly, even if there is any change of the application framework or the software architecture, the change would not affect the program on the user's side. So, a part(s) to be modified can be localized and the cost of modification work including a test can be reduced.

What is claimed is:

1. An automatic program generation device for automatically generating a program for buffering differences of the way to use a component for implementation during different software environments where the component is used, the automatic program generation device comprising:
a controller for executing automatic generation of the buffer program;
a memory including control information and a processing program for automatic generation of the buffer program;
an input device for inputting processing information of the component; and an output device for outputting the automatically generated buffer program;

wherein the memory records a plurality of forms for buffering differences of the way to use the component as the control information; and wherein according to the processing program, the controller:

extracts characteristic information from the processing information of the component, which has been input, and records the extracted characteristic information as the control information in the memory;

reads the extracted characteristic information and the plurality of forms from the control information of the memory and selects a specified form from the plurality of forms based only on the characteristic information; and generates the buffer program based on the selected form and the characteristic information;

wherein the plurality of forms are a plurality of program templates for the buffer program; and wherein the controller:

selects a specified template program from the plurality of program templates based on the characteristic information; and generates the buffer program based on the selected program template.

2. The automatic program generation device according to claim 1, wherein the characteristic information includes:

property information of processing of the component; and program reference information of the component.

3. The automatic program generation device according to claim 2, wherein the property information includes:

identification information of the component;

an architecture for which the component is used; and a location of the component used in the architecture.

4. The automatic program generation device according to claim 2, wherein the reference information includes:

a call function name of the component; and a handler function name of the component.

5. The automatic program generation device according to claim 1, wherein the controller:

complements incomplete descriptions of the selected program template based on the characteristic information; and outputs the complemented program as the buffer program from the output device.

6. The automatic program generation device according to claim 5, wherein the program template is a source code for the corresponding application framework, which is supported by the template program, and some parts of the program template are the incomplete descriptions.

7. The automatic program generation device according to claim 6, wherein the controller complements the incomplete descriptions with at least one of a base function name, caller function name, and handler function name of the component.

8. The automatic program generation device according to claim 6, wherein the incomplete descriptions are composed of alternate text information and the controller judges the alternate text information from a code part of the program template.

9. The automatic program generation device according to claim 1, wherein each of the plurality of program templates is classified by a plurality of combinations of the architecture, for which the component is used, and the location of the component in the architecture.

* * * * *